Oct. 26, 1948.   N. M. BRYSON   2,452,289
BRIDGE RAMP

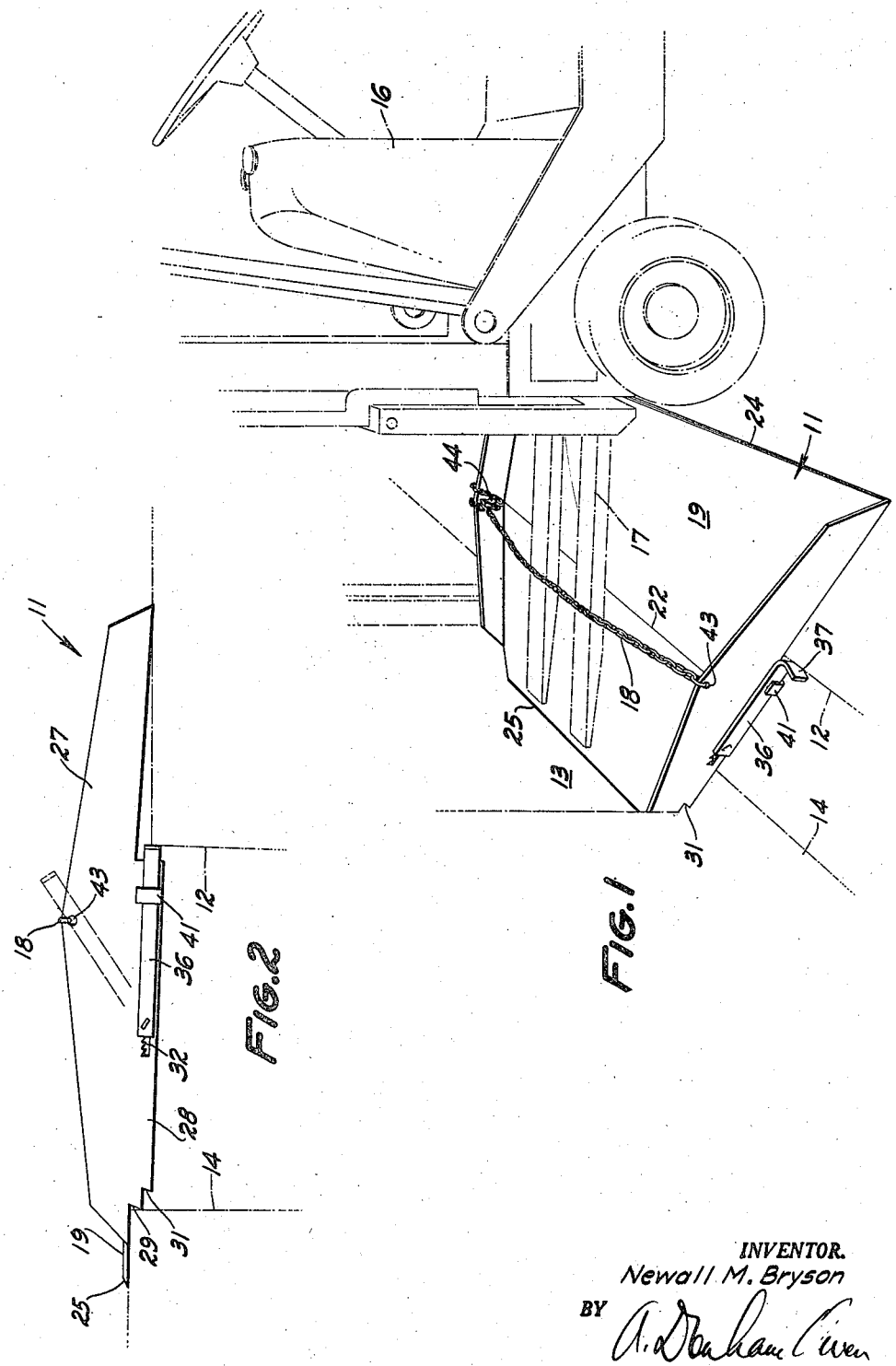

Filed April 2, 1946   2 Sheets-Sheet 2

INVENTOR.
Newall M. Bryson
BY
ATTORNEY

Patented Oct. 26, 1948

2,452,289

UNITED STATES PATENT OFFICE 2,452,289

BRIDGE RAMP

Newall M. Bryson, San Francisco, Calif., assignor to Pallet Engineering Company, San Francisco, Calif., a firm Application April 2, 1946, Serial No. 658,973

2 Claims. (Cl. 14—72)

This invention relates to dock boards and, more particularly, to improved dock boards of the type employed to span the gap between spaced platforms, such, for example, as the floor of a railroad freight car and an adjacent loading dock.

The principal object of the invention is to provide an improved dock board that is adapted to bridge gaps between platforms disposed in many varied relationships.

Another object of the invention is to provide a dock board that may be securely anchored in place in any of a variety of positions with respect to spaced platforms defining a gap to be bridged, whereby maximum loading efficiency may be facilitated in cramped quarters at either or both ends of the dock board.

Another object of the invention is to provide a dock board that satisfies the foregoing objectives and, yet is simple to manufacture and convenient to use.

Another object of the invention is to provide a dock board that satisfies the foregoing objectives and, yet, affords a high degree of safety against the usual hazards, such as running off one side of the ramp, skidding on the surface thereof, and jarring the dock board into a precarious position when approaching or leaving it incident to travel thereacross.

Another object of the invention is to provide a dock board having an improved mechanism for locking the dock board in position bridging a gap between spaced platforms, irrespective of a lack of uniformity in the width of the gap or in the elevations of the platforms along the opposite sides thereof.

Another object of the invention is to provide a dock board that is specially adapted to easy handling by one man operating a conventional dolly truck having an elevator type of loading fork.

Still further objects and advantages of the invention will become apparent from the following description of a preferred embodiment thereof, taken in conjunction with the accompanying drawings, in which:

Fig. 1 is a perspective view of a dock board bridging the gap between a loading platform and the doorway of a railroad freight car, a conventional dolly truck having an elevator type of loading fork being schematically shown in association therewith to illustrate how the dock board may be installed in position for use or removed when its use is no longer needed;

Fig. 2 is an elevational view of the dock board shown in Fig. 1, illustrating more clearly the relation between the dock board and the two platforms connected thereby;

Figure 3:
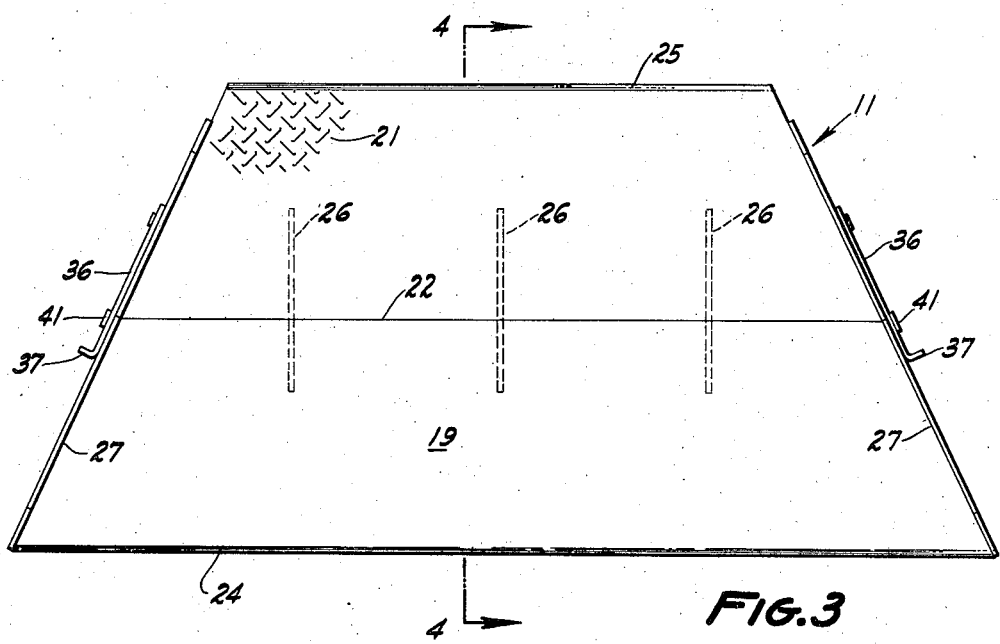
Fig. 3 is a plan view of the dock board.
Figure 4:
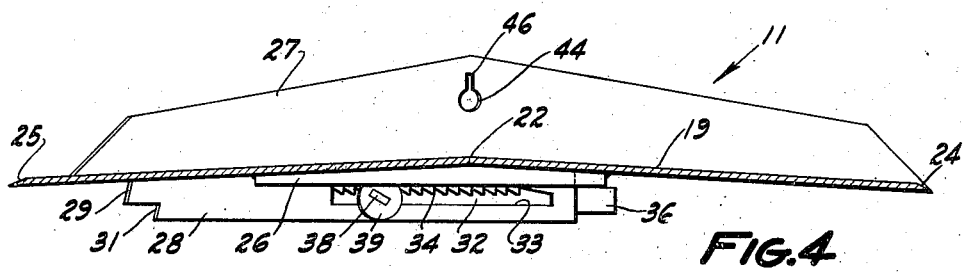
Fig. 4 is a vertical sectional view of the dock board, the plane of the section being indicated by the line 4—4 in Fig. 3.
Figure 5:
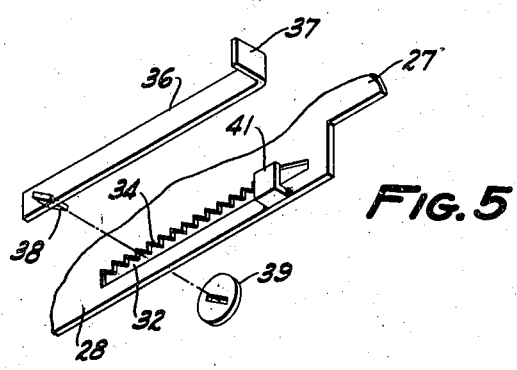
Fig. 5 is an exploded view of a portion of the clamping mechanism employed to lock the dock board in the position shown in Figs. 1 and 2.

Referring to the drawings, a dock board 11 embodying the present invention is shown in Fig. 1 spanning the gap between a loading dock 12 and the floor 13 of a freight car 14. A dolly truck 16, having an elevator type of loading fork 17, is schematically shown in position for lowering the dock board 11 into place or for removing it, the dock board being suspended from the loading fork 17 for this purpose by means of a chain 18, or the like, in a manner described in more detail hereinafter.

The structural features of the dock board shown in Fig. 1 and illustrated in greater detail in the other figures of the drawings, include a ramp 19 that is preferably formed of rolled steel plate having its upper surface provided with a large number of small protuberances 21 adapted to impart anti-skid properties thereto. The width of the ramp 19 increases uniformly from a minimum width at one end, somewhat less than the doorway opening in a conventional freight car, to a maximum width at its opposite end, substantially greater than its minimum width. There is thus provided a wide entrance to the ramp from the loading dock 12, whereby a dolly truck on the loading platform may approach the ramp from any direction within a wide horizontal angle. The ramp 19 is bent along a transversely extending line 22 that preferably passes through the center of gravity thereof, so the ramp is bowed slightly upwardly between its ends for insuring that the end edges of the ramp will respectively contact the floor surface of the dock 12 and the floor surface 14 of the freight car 16, irrespective of moderate differences in their relative elevations. The amount of bending of the ramp for this purpose should not be so great, however, that too abrupt a rise from either loading surface will be produced. In order to minimize the jar resulting from wheels rolling over the end edges of the ramp, and to reduce the danger that a person walking over the ramp will trip over the end edges thereof, these edges are preferably chamfered as shown at 24 and 25. Reinforcing braces 26 may be welded to the bottom surface of the ramp 19 for increasing its rigidity.

Along its side edges, the ramp 19 is provided with complementary side plates 27 that project upwardly from one end of the ramp nearly to the opposite end thereof and serve as curbs or guide rails to prevent the wheels of a dolly or the like from running over the side edges of the ramp. The side plates 27 also assist the braces 26 in strengthening the ramp 19. The side plates 27 include portions that depend below the ramp for a portion of its length for engaging the edge of the floor 14 defining one side of the gap to be bridged and for carrying mechanism described hereinafter that is adjustable to engage the edge of the loading dock 12 defining the other side of the gap. The ends of the depending portions 28 that engage the edge of the floor 14 are preferably contoured to provide stepped or offset edge portions 29 and 31, whereby the depending portions 28 are better adapted for engaging freight car floor edges of different shapes and freight car floor edges disposed at different elevations with respect to the loading dock 12.

The adjustable dock engaging mechanisms respectively associated with the depending portions 28 of the side plates 27 are identical except for being of opposite hand, and the following description of one of them will be understood to apply to both. Each depending portion 28 is provided with a longitudinally extending slot 32 defined by a straight lower edge 33 and by an upper edge that is contoured to form a ratch 34 along a considerable portion of its length. A dock engaging arm 36 is provided with a laterally projecting ear or flange 37 at one end thereof that is adapted to bear against the side of the dock 12. At its opposite end, the arm 36 is pivotally mounted on the associated depending portion 28 of the side plate 27 by means of a short, flat, pivot bar 38 that may be integrally formed with the arm 36, as by welding. The pivot bar 38 projects laterally from the arm 36 through the adjacent slot 32 and terminates in a retaining disk 39 that may be integrally formed with the pivot bar 38, as by welding. When the arm 36 is tilted upwardly about the pivot bar 38 with respect to the slot 32, the pivot bar has its wide dimension parallel to the slot, and it is free to slide along the slot 32 in either direction from one end thereof to the other. When the arm 36 is pivotally swung back to a position parallel to the slot 32 the opposite side edges of the pivot bar respectively the lower edge 33 of the slot 32 and one of the teeth of the ratch 34 so as to lock the arm 36 against movement along the slot in one direction while still permitting movement of the arm along the slot in the opposite direction with only a slight upward tilt thereof as the pivot bar rides over the crest of each successive ratch tooth. The assembly is so arranged that the arm 36 is always free to move toward the wide end of the ramp and so that it may be locked in the manner described against movement toward the narrow end of the ramp. A bracket 41 is welded or otherwise rigidly secured to each depending portion 28 of the side plates 27 so as to form a stop for preventing the associated arm 36 from tending to swing downwardly with respect to the slots 32 below a position parallel thereto.

When the dock board is lowered into a position bridging the gap between two platforms, such as a loading dock 12 and the floor 13 of a freight car 14, one end of one or both of the depending portions 28 of the side plates 27 is brought into abutment with the side edge of the platform 13, for example. The dock board is then locked against accidental, horizontal, sliding movement merely by moving both dock engaging arms, while they are supported in generally horizontally disposed positions by the brackets 41, longitudinally in a direction to bring their respective ears 36 into abutment with the adjacent side edge of the other platform 12. Because the two pivot bars are oriented for engaging their respective ratches 34, the dock engaging arms are locked against subsequent longitudinal movement in the opposite direction unless they are manually tilted upwardly for this purpose. The positions of the brackets 41 prevent the dock engaging arms 36 from tilting downwardly far enough for the engaged side of the platform 12 to prevent subsequent upward tilting of the arms for releasing the dock board. Two points of contact with the side edge of the platform 12 may always be effected by the two dock engaging arms 36, and, depending upon whether or not the opposite side edges of the two platforms 12 and 13 are parallel, either one or two points of contact with the side edge of the platform 13 will be effected by one or both of the adjacent ends of the depending side plate portions 28. In either case, the dock board will be positively anchored against accidental, longitudinal, sliding movement and against accidental, rotary, sliding movement about its vertical axis when it is jarred by transporting loads over the ramp 19 from one platform to the other.

Because the two dock engaging arms are independently adjustable, the opposite side edges of the two platforms may be disposed out of parallel to a very substantial degree without impairing the effectiveness of the mechanism for locking the dock board in place. Moreover, when it is desired to approach or leave the ramp at a particularly wide horizontal angle, it is possible to anchor the dock board just as firmly in place with its longitudinal center line disposed at a substantial horizontal angle with a normal to either of the opposed side edges of the two platforms.

To facilitate quick and easy handling of the dock board 11, one end of the chain 18 may be secured to the upper edge of one of the side plates 27 in any suitable manner, as by a hook 42 on the chain passing through an aperture 43 in the side plate; and the opposite end of the chain may be passed through an aperture 44 in the other side plate. To permit ready adjustment of the amount of slack in the chain 18 between the two side plates while facilitating easy anchoring of the chain in the aperture 44, this aperture is preferably formed with an upwardly projecting slot 46 communicating therewith, the width of the slot 46 being great enough to accommodate a single, properly oriented link of the chain but narrow enough to prevent an adjacent link, normally turned 90° with respect to the link in the slot 46, from being pulled through the slot. Thus, the free end of the chain 18 may be passed through the aperture 44, and the link that is disposed within the aperture may be raised into the slot 46 and held therein by looping the remaining free portion of the chain over the upper edge of the adjacent side plate 27, under the portion thereof extending between the two side plates, and back over the upper edge of the adjacent side plate again. This operation can be rapidly performed, and the chain will be thereby anchored in the aperture 44 more securely than it could be anchored with comparable effort and time by tying it with a common knot, hitch, or the like.

When the chain 18 has been secured in place in the manner described, one man operating a dolly truck having an elevator type loadling fork may lift the dock board from one location, transport it to another location, and set it down again in any desired position for bridging a gap between two platforms. As illustrated in Fig. 1, this may be done merely by running the loading fork under the chain 18, elevating the loading fork, and driving the dolly truck to the new location, where it may again be lowered into place by dropping the loading fork down again. When the dock board 11 has once been positioned in this manner, the chain 18 may be quickly pulled out of the aperture 44 in an obvious manner and thrown to one side to permit travel over the ramp 19.

From the foregoing description of a preferred embodiment of the invention, it will be apparent that I have provided a dock board that is admirably adapted to bridge gaps between platforms disposed in many varied relationships and that may be securely anchored in place while disposed for maximum loading efficiency. It will also be apparent that this has been accomplished by means of a structure that is simple and inexpensive to manufacture and convenient to use under a wide variety of conditions with a high degree of safety against the usual hazards, such as running off one side of the ramp, skidding on the surface thereof, or jarring the dock board out of place when approaching or leaving it.

While I have disclosed a single preferred embodiment of the invention in considerable detail, it is to be understood that this has been done for illustrative purposes and that the invention is not limited to the details disclosed except as required by the appended claims.

I claim:

1. A dock board for bridging the gap between two spaced-apart platforms, comprising a ramp having a stop at one end to engage one of said platforms and a vertically depending plate portion adjacent each side edge, said plate portion having a longitudinal slot therein, the upper edge of said slot having ratchet teeth therealong; and a slidable locking bar, one end extending beyond said plate portion for engaging one of said platforms, and the opposite end of said locking bar having an inclined locking member, the lower edge of said locking member slidably supported on the lower edge of said slot and the upper edge of said locking member selectively engaging said ratchet teeth.

2. A dock board for bridging the gap between two spaced-apart platforms, comprising a ramp having a stop at one end to engage one of said platforms and a vertically depending plate portion adjacent each side edge, said plate portion having a longitudinal slot therein, one longitudinal edge of said slot having ratchet teeth therealong; a slidable locking bar, one end extending beyond said plate portion for engaging one of said platforms, and the opposite end of said locking bar having an inclined locking member, said locking member being adapted for sliding movement along said slot against the non-ratched edge thereof when said locking bar is in one rotative position and being adapted to selectively engage said ratchet teeth when said locking bar is in a different rotative position.

NEWALL M. BRYSON.

REFERENCES CITED

The following references are of record in the file of this patent:

UNITED STATES PATENTS

| Number | Name | Date |
|---|---|---|
| 132,442 | Clarke | Oct. 22, 1872 |
| 1,131,783 | Howard | Mar. 16, 1915 |
| 1,144,836 | Green | June 29, 1915 |
| 1,178,661 | Martin | Apr. 11, 1916 |
| 1,882,512 | Lovejoy | Oct. 11, 1932 |
| 2,284,022 | Schmeller, Sr. | May 26, 1942 |
| 2,337,138 | Van Berg | Dec. 21, 1943 |